United States Patent
Suzuki et al.

(10) Patent No.: US 7,636,108 B2
(45) Date of Patent: Dec. 22, 2009

(54) IMAGE PICKUP DEVICE, WHITE BALANCE PROCESSING METHOD, PROGRAM, AND STORAGE MEDIUM

(75) Inventors: Shoichi Suzuki, Kanagawa (JP); Eiichiro Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 663 days.

(21) Appl. No.: 10/808,556

(22) Filed: Mar. 25, 2004

(65) Prior Publication Data

US 2004/0196383 A1     Oct. 7, 2004

(30) Foreign Application Priority Data

Apr. 3, 2003   (JP)   ............... 2003-100178

(51) Int. Cl.
     *H04N 9/73*   (2006.01)
(52) U.S. Cl. .................................. 348/223.1
(58) Field of Classification Search ............. 348/223.1, 348/655, 333.11, 207.99; 358/516
     See application file for complete search history.

(56) References Cited

U.S. PATENT DOCUMENTS

| | | | |
|---|---|---|---|
| 5,146,323 A * | 9/1992 | Kobori et al. ............... 358/527 |
| 5,267,031 A * | 11/1993 | Katoh et al. ................ 358/527 |
| 5,712,924 A * | 1/1998 | Fujimoto et al. ............ 382/165 |
| 6,072,526 A * | 6/2000 | Hashimoto et al. ........ 348/223.1 |
| 6,160,579 A | 12/2000 | Shiraiwa et al. ............. 348/224 |
| 6,862,039 B2 * | 3/2005 | Shimizu .................. 348/223.1 |
| 6,906,744 B1 * | 6/2005 | Hoshuyama et al. ...... 348/223.1 |
| 6,917,382 B1 | 7/2005 | Ikeda ......................... 348/254 |
| 6,947,078 B1 * | 9/2005 | Kuwata et al. ........... 348/223.1 |
| 6,952,225 B1 * | 10/2005 | Hyodo et al. ............ 348/223.1 |
| 7,133,070 B2 * | 11/2006 | Wheeler et al. .......... 348/223.1 |
| 7,146,041 B2 * | 12/2006 | Takahashi .................... 382/167 |
| 2002/0018129 A1 * | 2/2002 | Ikeda ......................... 348/223 |
| 2002/0027601 A1 * | 3/2002 | Nakayama et al. ......... 348/223 |
| 2003/0001958 A1 * | 1/2003 | Hoshuyama ............. 348/223.1 |
| 2003/0090750 A1 * | 5/2003 | Takahashi .................... 358/516 |
| 2003/0169348 A1 * | 9/2003 | Ikeda et al. .............. 348/223.1 |
| 2004/0151370 A1 * | 8/2004 | Sasaki ........................ 382/162 |

* cited by examiner

*Primary Examiner*—Tuan Ho
*Assistant Examiner*—Kent Wang
(74) *Attorney, Agent, or Firm*—Fitzpatrick, Cella, Harper & Scinto

(57) ABSTRACT

A problem in that a color photographed at high color temperature such as a skin color is erroneously judged as a white color at low color temperature, and the skin having a chromatic color is colored with white color can be resolved. In an image pickup device a given chromatic color area on a photography screen is instructed; a color temperature of a light source is specified on the basis of an output signal within the instructed area; and white balance processing is conducted in accordance with a white balance coefficient that corresponds to the specified color temperature of the light source.

7 Claims, 14 Drawing Sheets

FIG. 1A

| R | G1 | | R | G1 |
|---|----|----|---|----|
| G2 | B | | G2 | B |
| R | G1 | | R | G1 |
| G2 | B | | G2 | B |

| R | G1 | | R | G1 |
|---|----|----|---|----|
| G2 | B | | G2 | B |

PRIOR ART

FIG. 1B

| R | G1 |
|---|----|
| G2 | B |

1 BLOCK

PRIOR ART

PRIOR ART

| AREA NUMBER | 1 | 2 | 3 | 4 | 5 |
|---|---|---|---|---|---|
| NUMBER OF BLOCKS | 3 | 0 | | 0 | 20 |
| Cx | −150 | −100 | 0 | 50 | 100 |
| COLOR TEMPERATURE (K) | 7000 | 6000 | 5000 | 4000 | 3000 |

IMAGE PICKUP DEVICE, WHITE BALANCE PROCESSING METHOD, PROGRAM, AND STORAGE MEDIUM

BACKGROUND OF THE INVENTION

1. Field of the Invention

The present invention relates to white balance processing for an image pickup device such as a digital camera or a video camera.

2. Related Background Art

White balance processing in a conventional image pickup device is conducted as follows.

First, a signal that is outputted from an image device through primary-color filters is digitalized by A/D conversion, and divided into blocks shown in FIG. 1A, respectively. Each of the blocks is structured by a unit including respective color signals R, G1, G2, and B, one by one, as shown in FIG. 1B. A color evaluated value of each of those blocks is calculated (where $Cx=(R-B)/Y$ and $Cy=(R+B-2)/Y$).

$$C_x = \frac{(R+G_2)-(B+G_1)}{Y_i} \quad \text{Expression (1)}$$

$$C_y = \frac{(R+B)/4 - (G_1-G_2)/4}{Y_i}$$

$$Y_i = \frac{R+G_1+G_2+B}{4}$$

FIG. 2 shows a color space in which the axis of abscissa is $Cx=(R-B)/Y$ and the axis of ordinate is $Cy=(R+B-2)/Y$, and shows a white axis determined by picking up a white color at a high color temperature to a low color temperature in advance and plotting color evaluated values Cx and Cy. Because there exists a slight variation of white color in an actual light source, it is assumed that a wide area having the white axis as a center is set as a white detection area (an area to be judged as white). That is, the color evaluated values Cx and Cy obtained in the respective blocks are plotted in the color axis shown in FIG. 2. Then, it is assumed that a block of the color evaluated values included in the white detection area among all of the color evaluated values is white color. In addition, integrated value SumR, SumG1, SumG2, and SumB in the color pixels within the white detection area are calculated to calculate a white balance gain by using the following expressions. In the expressions, kWB_R, kWB_G1, kWB_G2, and kWB_B are white balance gains of the respective color signals R, G1, G2, and B.

$kWB\_R = 1.0/\text{Sum}R$ $kWB\_G_1 = 1.0/\text{Sum}G_1$ $kWB\_G_2 = 1.0/\text{Sum}G_2$ $kWB\_B = 1.0/\text{Sum}B$ \quad Expression (2)

However, the conventional white balance coefficient calculation suffers from the following drawbacks. At high color temperature, the white color evaluated values distribute in the vicinity of an area A in FIG. 2. However, under a high color temperature light source, if, for example, the color evaluated values Cx and Cy of a skin are plotted in the color axis, the color evaluated values Cx and Cy are caused to distribute at the low color temperature side in the white detection area. Therefore, in a scene where a white color is little in a photography screen and a close-up of the skin is taken, the color evaluated value of the screen is caused to distribute in an area B shown in FIG. 2. That is, there arises such a problem in that the skin color is erroneously judged as the white color at low color temperature, and the skin is colored with white color.

SUMMARY OF THE INVENTION

The present invention can conduct appropriate white balance processing without being adversely affected by a chromatic color even when an achromatic color such as gray or white does not exist in the screen. According to an embodiment of the present invention, there is employed a construction in which an image pickup device includes: an image device; an instruction unit that instructs a given chromatic color area on a photography screen; and a white balance processing unit that specifies a color temperature of a light source on the basis of an output signal of the image device within the instructed area, and conducts white balance processing in accordance with a white balance coefficient that corresponds to the specified color temperature of the light source.

Further, according to another embodiment of the present invention, there is employed a construction in which a white balance processing method for an image pickup device includes: instructing a display device that displays an image and a given chromatic color area of the image on the display device; specifying a color temperature of a light source on the basis of an image signal within the instructed area; and conducting white balance processing in accordance with a white balance coefficient that corresponds to the specified color temperature of the light source.

Further, according to another embodiment of the present invention, there is employed a program for executing the white balance processing method described above.

Further, according to another embodiment of the present invention, there is employed a storage medium that stores the program described above.

Other objects and characteristics of the present invention will be apparent from the following specification and drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a diagram showing an example in which primary-color filters are arranged;

FIG. 1B is a diagram showing one block where a color evaluated value is calculated;

DESCRIPTION OF THE PREFERRED EMBODIMENTS

Preferred embodiments of the present invention will be described in detail in accordance with the accompanying drawings.

First Embodiment

Figure 3:
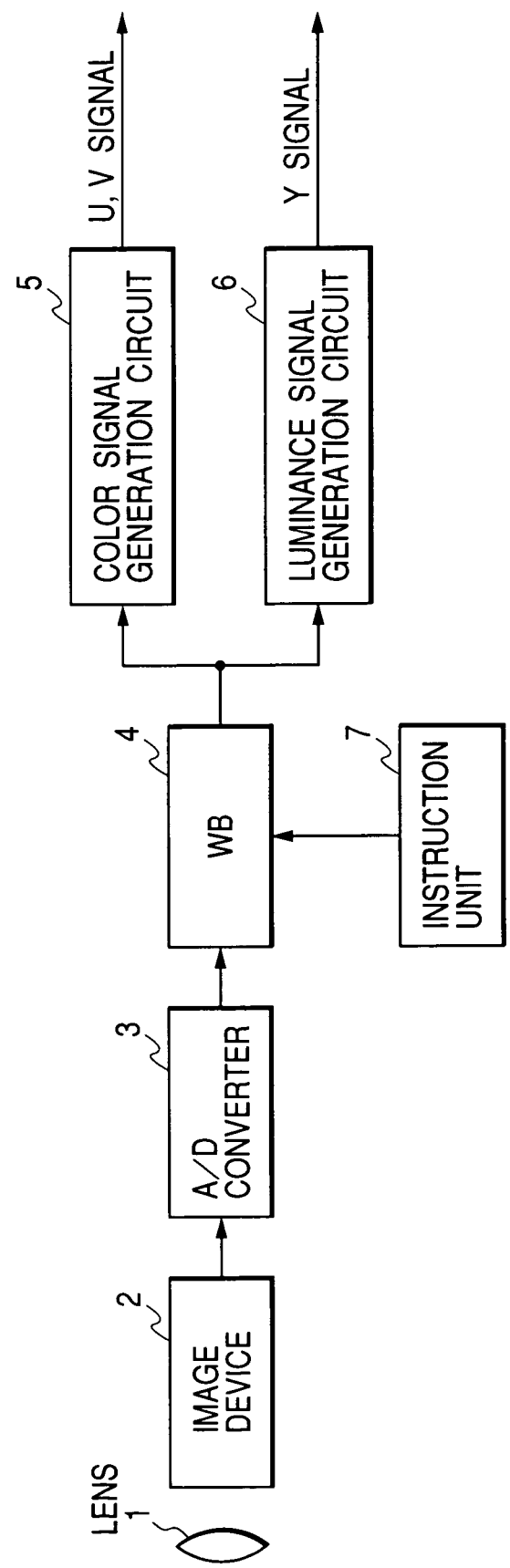
FIG. 3 is a block diagram showing an image pickup device in accordance with the present invention.

FIG. 3 is a block diagram showing the outline structure of an image pickup device having a white balance device in accordance with an embodiment of the present invention.

In FIG. 3, light that has passed through a lens 1 is received by an image device 2 such as a CCD, and an output signal from the image device 2 is converted into a digital signal by an A/D converter 3. After that, white balance processing is executed in a WB circuit 4, color-difference signals U and V are generated in a color signal generation circuit 5, and a luminance signal Y is generated in a luminance signal generation circuit 6. Through the above processing, a color image is obtained. Also, an instruction unit 7 specifies a partial area within a photography screen and sets a white balance mode.

Figure 6:
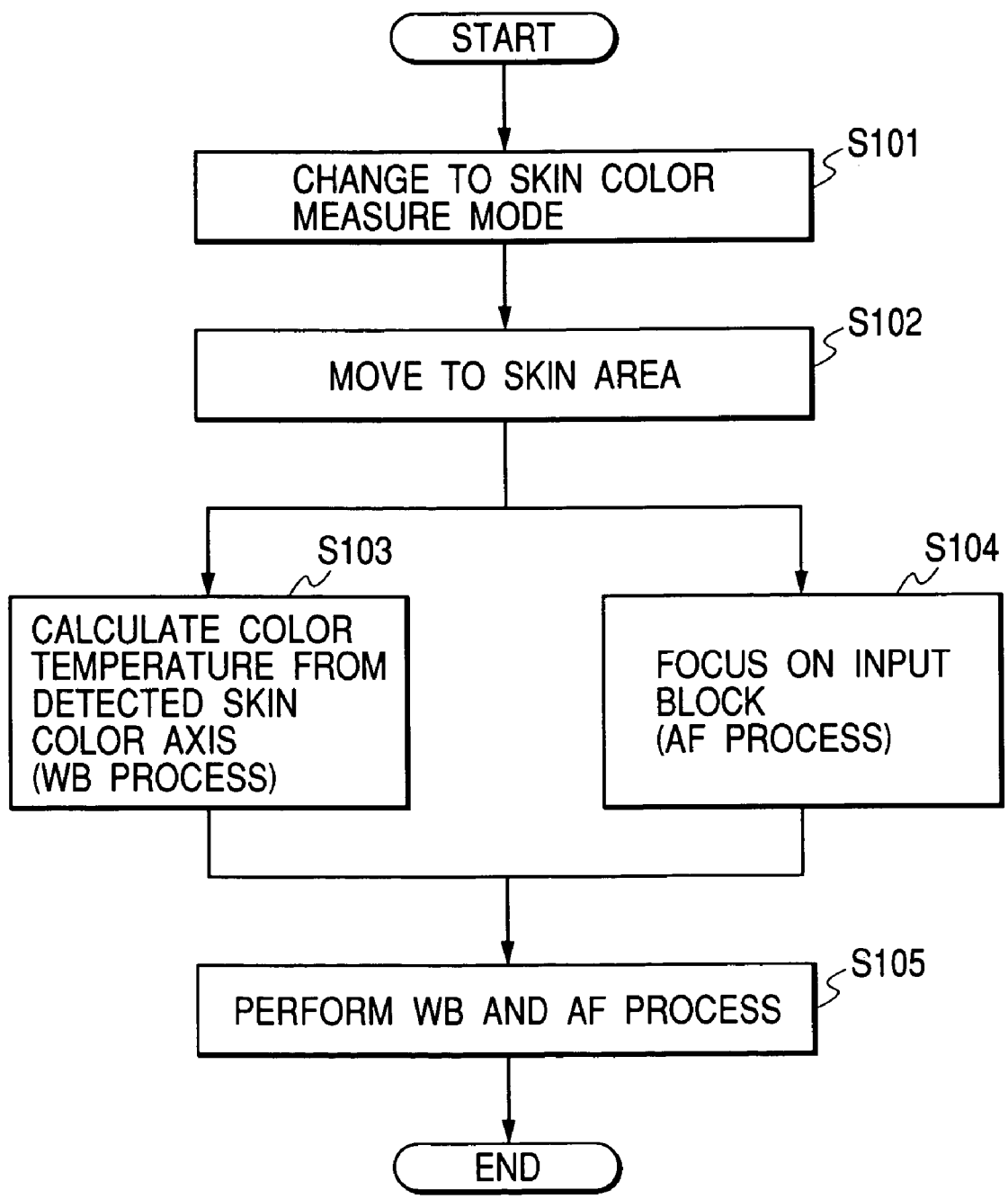
FIG. 6 is a flow chart showing the operation processing of the image pickup device in accordance with a first embodiment of the present invention.

The operation processing in the image pickup device in accordance with this embodiment is shown in a flowchart of FIG. 6, and the operation processing will be described.

First, in Step S101, a mode for adjusting the white balance is set to a skin color measure mode.

Figure 7:
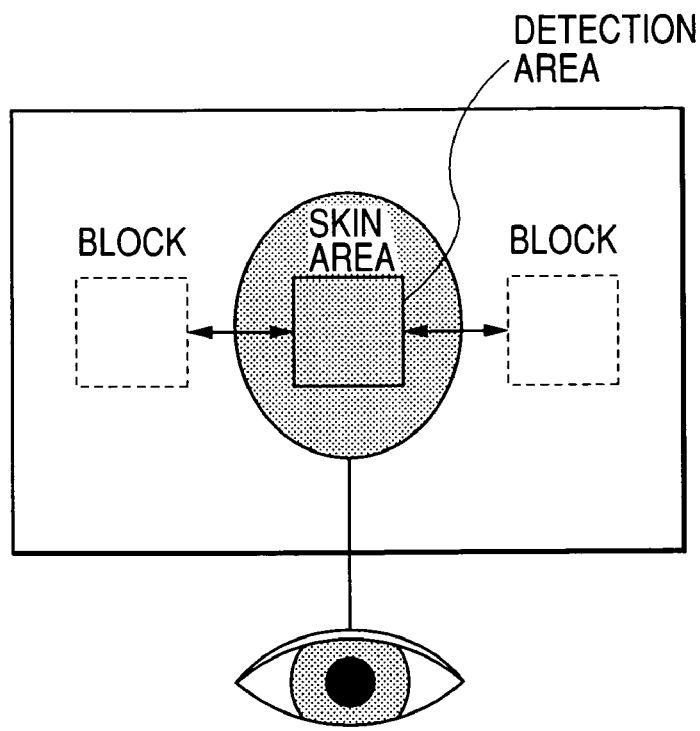
FIG. 7 is a diagram showing an example of a photography screen displayed on a view finder and a detection area that is superimposed on the photography screen in accordance with the respective embodiments of the present invention.

In Step S102, a photographer changes the size of or moves a detection area (refer to FIG. 7) on a photography screen displayed on an electronic view finder (EVF) (not shown) through the operation using the instruction unit 7 so as to be identical with a skin color portion such as a face to be photographed. In this situation, the instruction unit 7 may apply a touch panel or a visual line input. Then, when the photographer turns on a calibration switch (not shown), a color signal (an output signal from the image device) within the area is extracted in the WB circuit.

Then, in Step S103, a signal from the image device in the area is divided into a plurality of blocks including R, G1, G2, and B, and this minimum unit is set as one block (refer to FIG. 1B). Then, a judgment is made whether each block is the skin color, or not.

Figure 2:
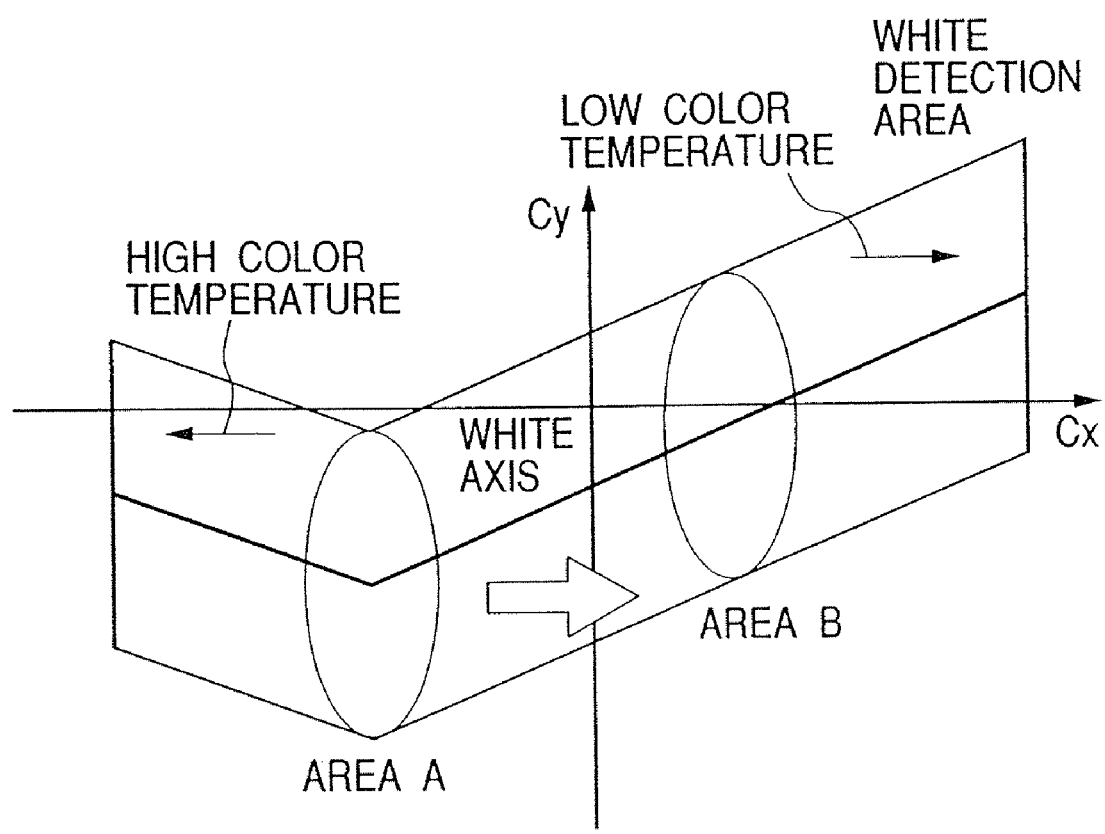
FIG. 2 is a diagram showing a white axis representing the movement of a white color evaluated value that varies in accordance with a change in a color temperature and a white detection area representing an area to be judged as white.
Figure 4:
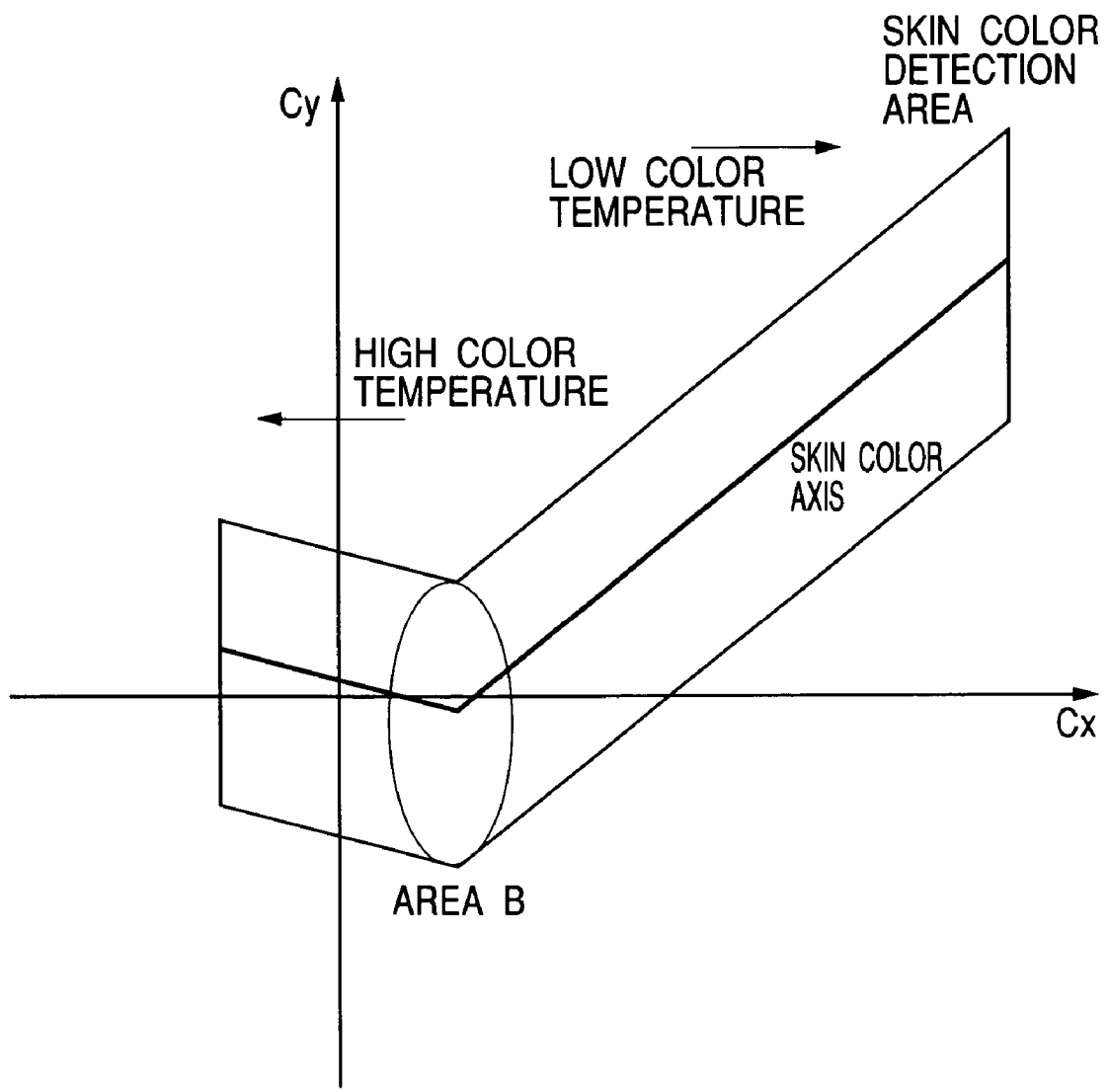
FIG. 4 is a diagram showing a skin color axis representing the movement of a skin color evaluated value that varies in accordance with a change in a color temperature and a skin color detection area representing an area to be judged as a skin.

Now, a judging method will be described. First, color evaluated values Cx and Cy of the skin color under the light sources including a high color temperature to a low color temperature are experimentally obtained in advance, and a skin color axis as a reference is determined. Then, the color evaluated value Cx corresponding to each of the color temperature light sources is written into a ROM (not shown). In addition, Cx and Cy of the skin color under various light sources such as a fluorescent light are measured, and a width is given the above-mentioned skin color axis so that the measured Cx and Cy are judged as the skin color. Then, the skin color axis having the width is determined as a skin color detection area to be judged as the skin color and written into the ROM. The skin color axis and the skin color detection area are shown in the color space of FIG. 4. FIG. 4 shows the color space in which the axis of abscissa is $Cx=(R-B)/Y$ and the axis of ordinate is $Cy=(R+B-2)/Y$ as in FIG. 2. In this embodiment, a judgment is made in advance depending on whether the color evaluated values Cx and Cy obtained for each of the blocks enter the skin color detection area, or not. However, the color evaluated values Cx and Cy are calculated from the expression (1).

In this example, Cx corresponds to the color temperature, and Cy corresponds to a green direction correction amount. Then, in the case where the skin color of a certain scene exists, for example, in an area B of FIG. 4, the area B is positioned relatively at the high color temperature side of the skin color detection area. Therefore, the light source can be judged as the high color temperature.

In Step S105, a WB coefficient is obtained by using the color temperature of the light source which is obtained from the skin color in Step S103, the assembly of the blocks that are judged as the skin color, and a distance to the skin color axis (that is, the assembly of the blocks included in the skin color detection area). An artificial light source such as a fluorescent light has a color rendition, and appropriate white balance processing is not conducted by only calculating the color temperature of the light source because the artificial light source is apart from a black body radiation characteristic (axis). Therefore, the color temperature is detected from a band-like area that is located at a given distance from the skin color axis (line) taking the distance to the skin color axis into consideration. The calculation of the white balance coefficient in this embodiment will be described in detail below.

First, in the assembly of the blocks that are judged as the skin color distributing within the skin color detection area, the skin color detection area is divided into a plurality of areas in a direction of the color axis Cx to calculate the number of blocks that enter the respective areas and the integrated values of the output values (R, G1, G2, B) of the respective color filters. The average output values Node (n) average of the respective color filters in the respective areas can be obtained in accordance with the number of blocks Node (n) Num of the respective areas and the integrated values Node (n) Sum of the output values of the respective color filters.

$$Node(n)averageR = \frac{Node(n)SumR}{Node(n)Num},$$

$$Node(n)averageG_1 = \frac{Node(n)SumG_1}{Node(n)Num}$$

$$Node(n)averageG_2 = \frac{Node(n)SumG_2}{Node(n)Num},$$

$$Node(n)averageB = \frac{Node(n)SumB}{Node(n)Num}$$

Expression (3)

Where Node(n) is directed to an n-th small area when the detection area is divided into n areas. Cx and Cy can be obtained for each of the areas by substituting the expression (1) for the expression (3).

$$Node(n)averageC_x$$

$$Node(n)averageC_y$$

Expression (4)

Figures 10, 11:
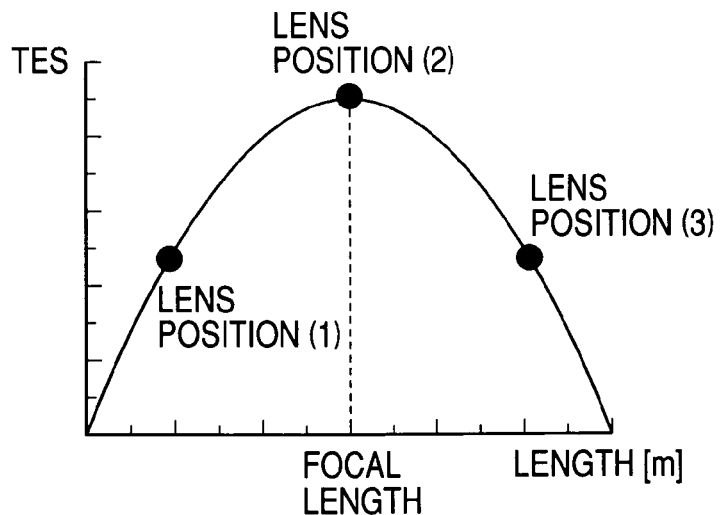
FIG. 10 is a diagram for explaining focal point adjusting operation in accordance with the first embodiment of the present invention.
FIG. 11 is a diagram showing an example of the color evaluated values and color temperatures corresponding to the respective divided skin color detection areas, and the number of blocks included in each of the skin color detection areas.

Then, the color temperature of the light source is obtained from the color temperature result of the respective areas, but even if the respective values are simply integrated, an accurate value is not obtained since the distribution of the color of an object to be photographed on the screen is not always uniform. For example, it is assumed that the number of blocks obtained for each of the areas, the color evaluated value Cx and color temperature which correspond to each of the areas are results shown in FIG. 11. In FIG. 11, because the number of blocks in the area 5 is large, it can be expected that the color temperature of the light source is approximately 3,000 K. However, when Cx obtained in each of the areas is merely averaged, Cx becomes approximately 60, and the color temperature is erroneously judged as approximately 4,000 K. That is, the color temperature of the area 1 largely gets involved in the judgement although the number of blocks that exist in the area 1 is small. Under the circumstances, under the assumption that an area having the largest number of blocks in the respective areas is a ratio 1, the weighting of the respective number of blocks (weighted average) is conducted. In an example of FIG. 11, the respective weight ratios of the areas 1, 2, 3, 4, and 5 are 0.15:0:0:0:1. As a result of this weighting, Cx becomes about 95 in the example of FIG. 11, and becomes a value that approximates 3,000 K which is the expected color temperature. Specifically, Cx is determined by reading the color temperature that corresponds to the value of Cx from the above-mentioned ROM. In addition, the WB coefficient is specified from the calculated color temperature of the light source. In this embodiment, the WB coefficient that corresponds to the color temperature of the light source is written in advance.

Furthermore, in addition to the weighting based on distribution of the number of blocks, the weighting based on brightness in the detection area may be available; for example, a weighting ratio for integrating blocks having approximate daylight temperature is increased because the bright area has daylight color temperature; in contrast, a weighting ratio for integrating blocks having low color temperature is decreased.

In the above-described embodiment of the present invention, the skin color detection area is divided into a plurality of areas, and the weighting of the color evaluated values is conducted in accordance with the number of blocks in each area. However, the average of the color evaluated values in the skin color detection area may be determined without dividing the skin color detection area. In this case, the operations of the color evaluated values are simplified.

As described above, since an area for detecting the skin color is specified within the photography screen, and the white balance processing can be conducted on the basis of the color evaluated value of that area, the white balance processing that does not depend on a chromatic color such as the skin can be conducted even in a state where no achromatic color such as white exists in the screen at all.

In this embodiment, the white balance processing is conducted on the photography screen that displays an output signal from the image device on an EVF at the time of image pickup. Alternatively, it is possible that an image after image pickup is displayed, and a chromatic area is specified on the displayed image to conduct another white balance processing again.

In this embodiment, different types of skin color, such as (a) "light skin tone", (b) "medium skin tone", and (c) "dark skin tone" are taken into consideration. By "light skin tone" is meant tone common in, for example, people indigenous to northern Europe; by "medium skin tone" is meant tone common in, for example, people indigenous to Asia; and by "dark skin tone" is meant tone common in, for example, people indigenous to central Africa.

Figure 5:
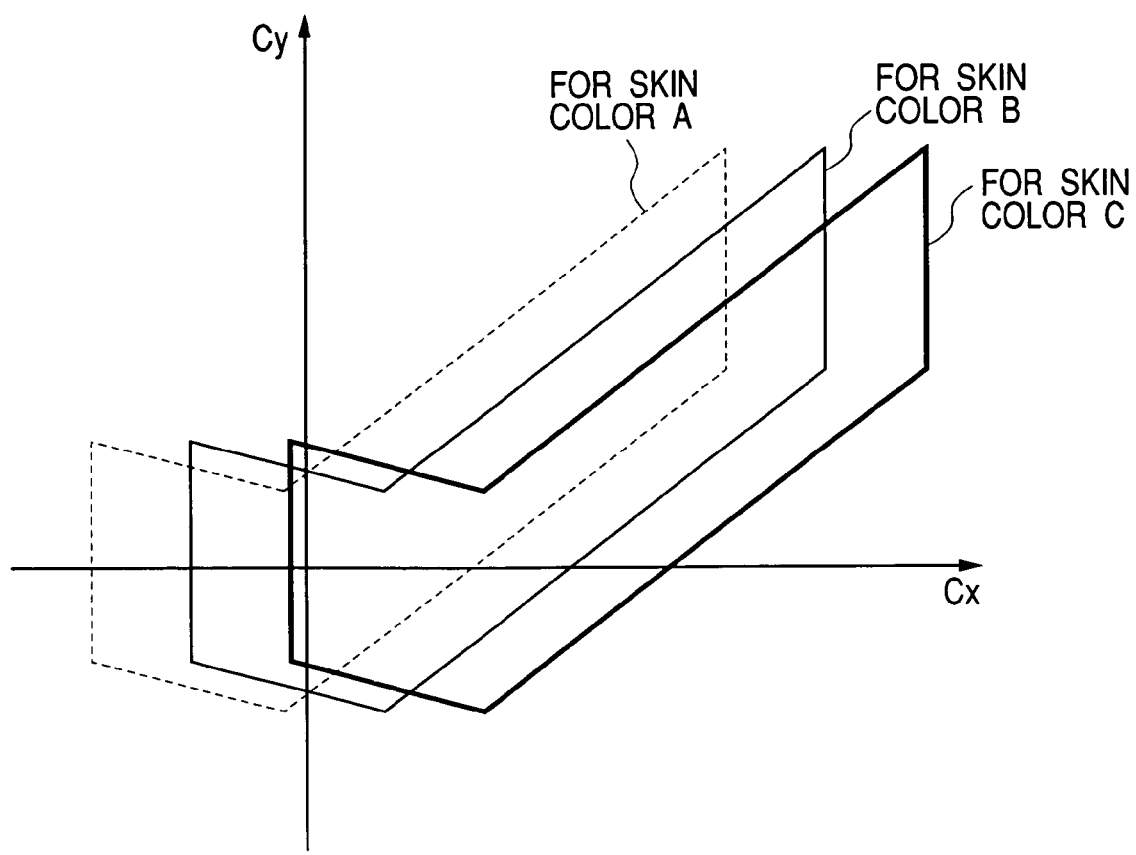
FIG. 5 is a diagram showing an example in which the skin color detection area is set.

As shown in FIG. 5, a skin color axis for each of a plurality of different types of skin colors is stored, and a skin color axis optimum for an object to be photographed is automatically determined on the basis of information such as, for example, language inputted to a camera, a position of the object, and area information from a position information detecting function device (global positioning system). In this way, it is possible to have an optimum white balance processing performed according to any of such information.

For example, in Step S101, the white balance processing can be achieved by selecting a skin color detection area from a plurality of areas in setting a mode to a skin color measure mode. Also, it is possible to set the skin color detection area on the basis of a language inputted from a microphone (not shown). Further, it is possible to select a chromatic color detection area (skin color detection area) in accordance with the selection of photography modes such as a portrait mode in which a person to be photographed is frequently located in the center of the screen, and a scenery mode in which a white color and a skin color are expected to be little.

Figure 16:
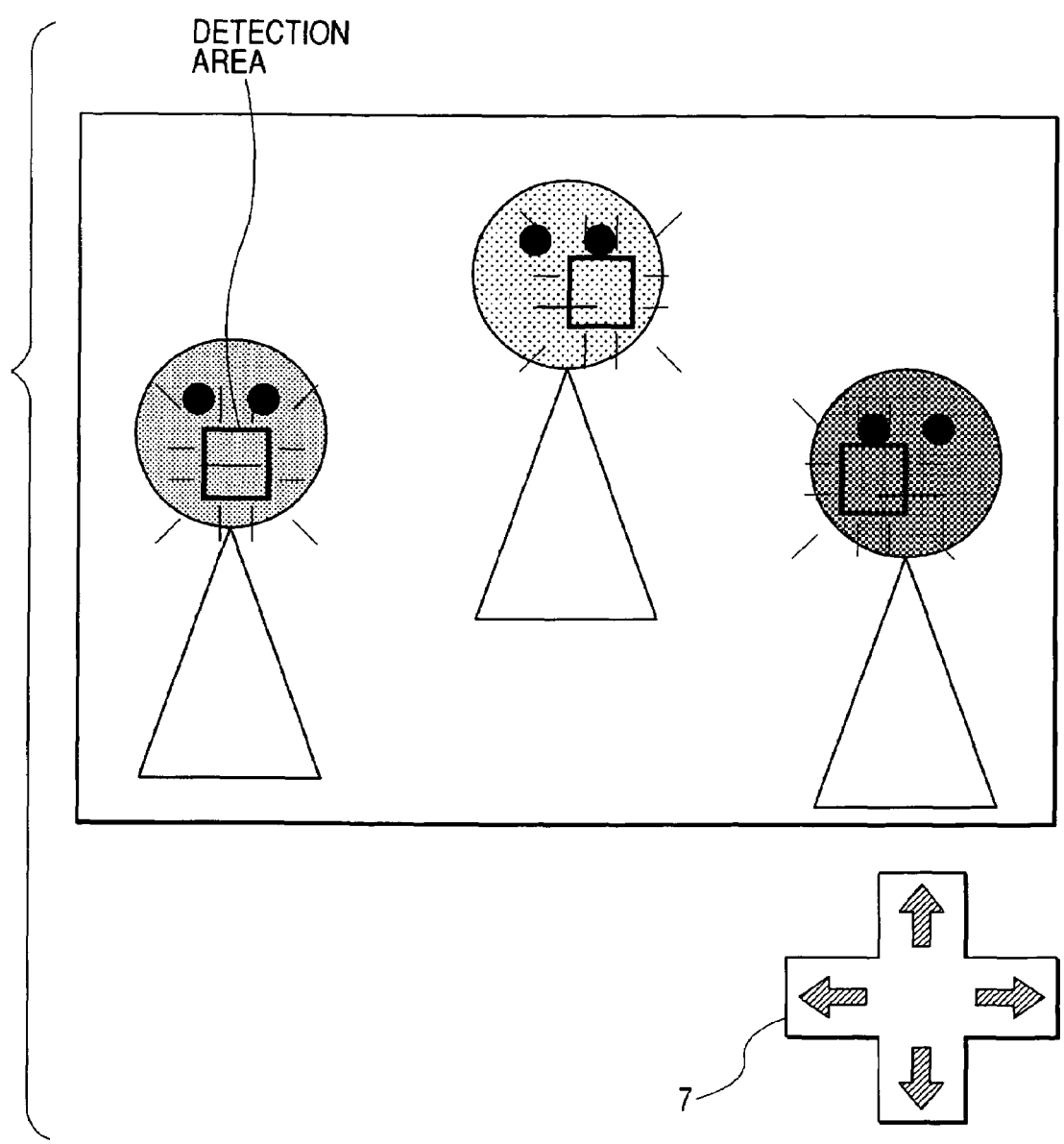
FIG. 16 is a diagram showing a user interface for designating skin color area in accordance with the present invention.
Figure 17:
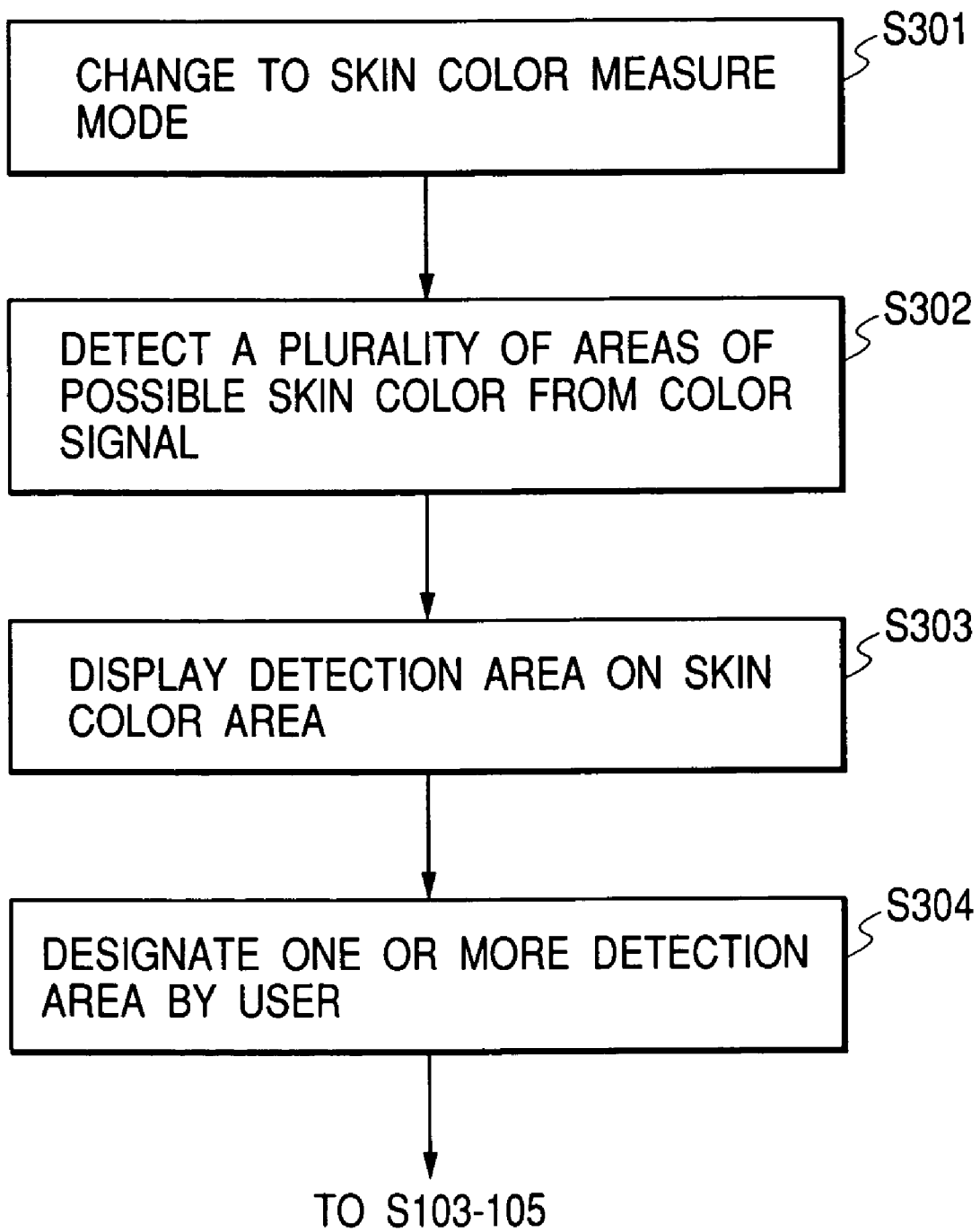
FIG. 17 is a flowchart showing the operation for designating a plurality of skin color areas in accordance with the present invention.

FIG. 16 shows a user interface for a plurality types of skin color areas such as tanned skin color or white skin color, and FIG. 17 shows a flowchart of the process. Upon being changed into skin color measure mode (S301), a plurality of areas of possible skin color is detected from a color signal output from the image device (S302), and the detection areas are displayed on each area which has been detected as skin color (S303). A user may move and designate one or more detection areas by instruction unit 7 from among a plurality of displayed detection areas (S304). The detection areas may be designated using a touch panel. And then, processes of steps S103-105 as shown in FIG. 6 are similarly executed. In the case where each color of the designated detection areas is different from each other, average value (a color between plurality of skin colors) may be available.

Figure 8:
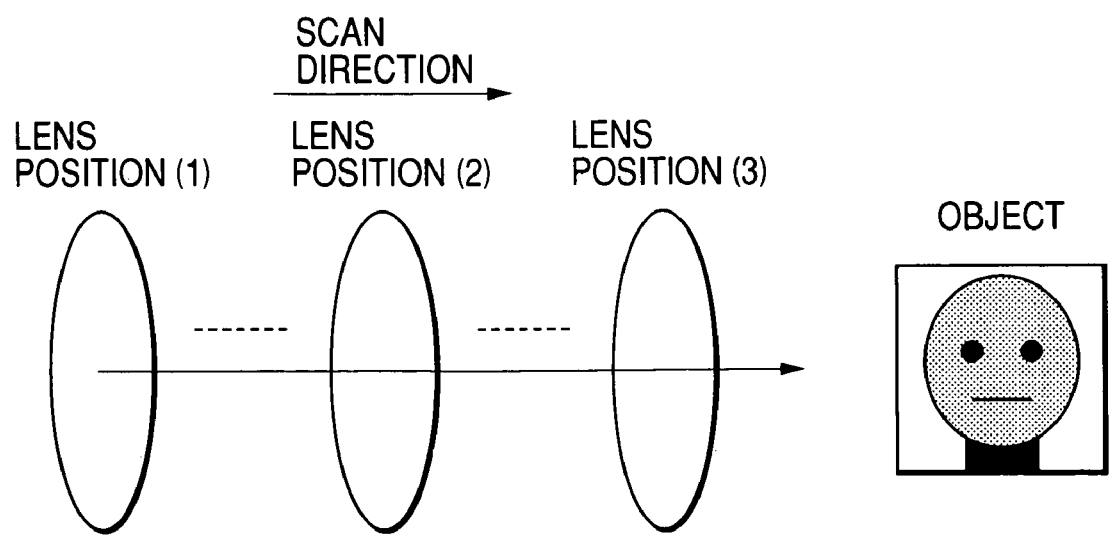
FIG. 8 is a diagram showing an example of the scanning operation of a lens in accordance with the first embodiment of the present invention.
Figure 9:
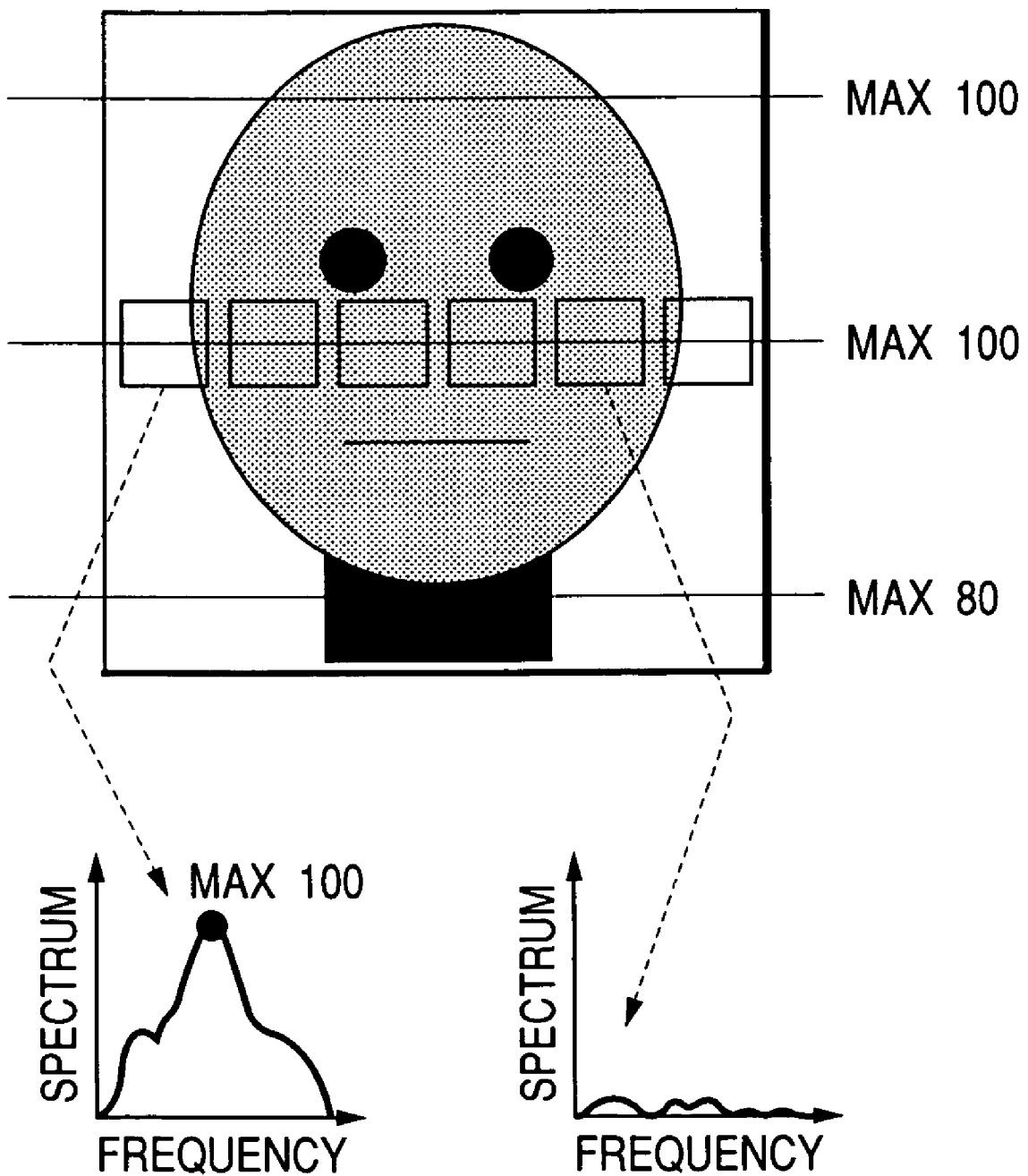
FIG. 9 is a diagram showing an example of the detecting operation of an image signal within the detection area in accordance with the first embodiment of the present invention.

In addition, because an object to be photographed (person) which will be photographed is located in the inputted area, the object to be photographed can be surely focused by focusing the area in which the object to be photographed exists even in the case where perspective is given. In Step S103, a frequency of a horizontal direction of an inputted area is calculated at a lens position (1) shown in FIG. 8. In this case, a plurality of blocks are provided in the horizontal direction, the amount of spectrum of the frequency is calculated for each of the blocks, and the largest value of the amount of spectrum for each of the blocks is stored (refer to FIG. 10). This processing is conducted from the upper toward the lower within the detection area, and the largest amounts of spectrums obtained in the respective blocks are integrated to determine a focal point evaluated value of the lens position (1). The focal point evaluated value is a high frequency component of a luminance signal that is obtained from the image device through a lens. It is assumed that a lens position is a focus position or state when the focal point evaluated value is the largest value. Similarly, the lens position is changed in the scan direction in FIG. 8, and the focal point evaluated values at the lens positions (2) and (3) are obtained as in the above-mentioned lens position (1). As a result, the focal point evaluated value with respect to the lens position can be graphed (refer to FIG. 10). The lens position is determined from the graph on the basis of such a definition that the lens position at which the amount of spectrum of the frequency is the largest on the screen is a focus position. As a result, even in the case where perspective is given, the object to be photographed can be surely focused.

As described above, according to the embodiment of the present invention, an extraction area of a color signal (in this example, the skin color of the object to be photographed) which is used in the white balance processing is specified on the photography screen, and the color temperature is calculated from the skin color within the area by using the skin color detection axis. As a result, an excellent skin can be expressed without erroneously recognizing the skin color of the high color temperature as the white color of the low color temperature as in the conventional art. In addition, the object to be photographed can be focused by automatically focusing a position in the area. In this embodiment, the skin color is set, but an extraction area to be specified may be an arbitrary chromatic color.

In the above-mentioned embodiment of the present invention, the white balance processing which is conducted by the image pickup device has been described. Alternatively, it is possible to execute the white balance processing in such a manner that a personal computer and an image pickup device are connected to each other, and a program code of software that realizes the function of the above-mentioned embodiment is executed on the personal computer. That is, it is possible that a user specifies an arbitrary chromatic color (skin color) while viewing a photography image displayed on a monitor, and sets a calculated white balance to the image pickup device through a communication means. The skin color detection area set in a ROM in advance may be read from the image pickup device.

Second Embodiment

Subsequently, a second embodiment of the present invention will be described below.

Figure 12:
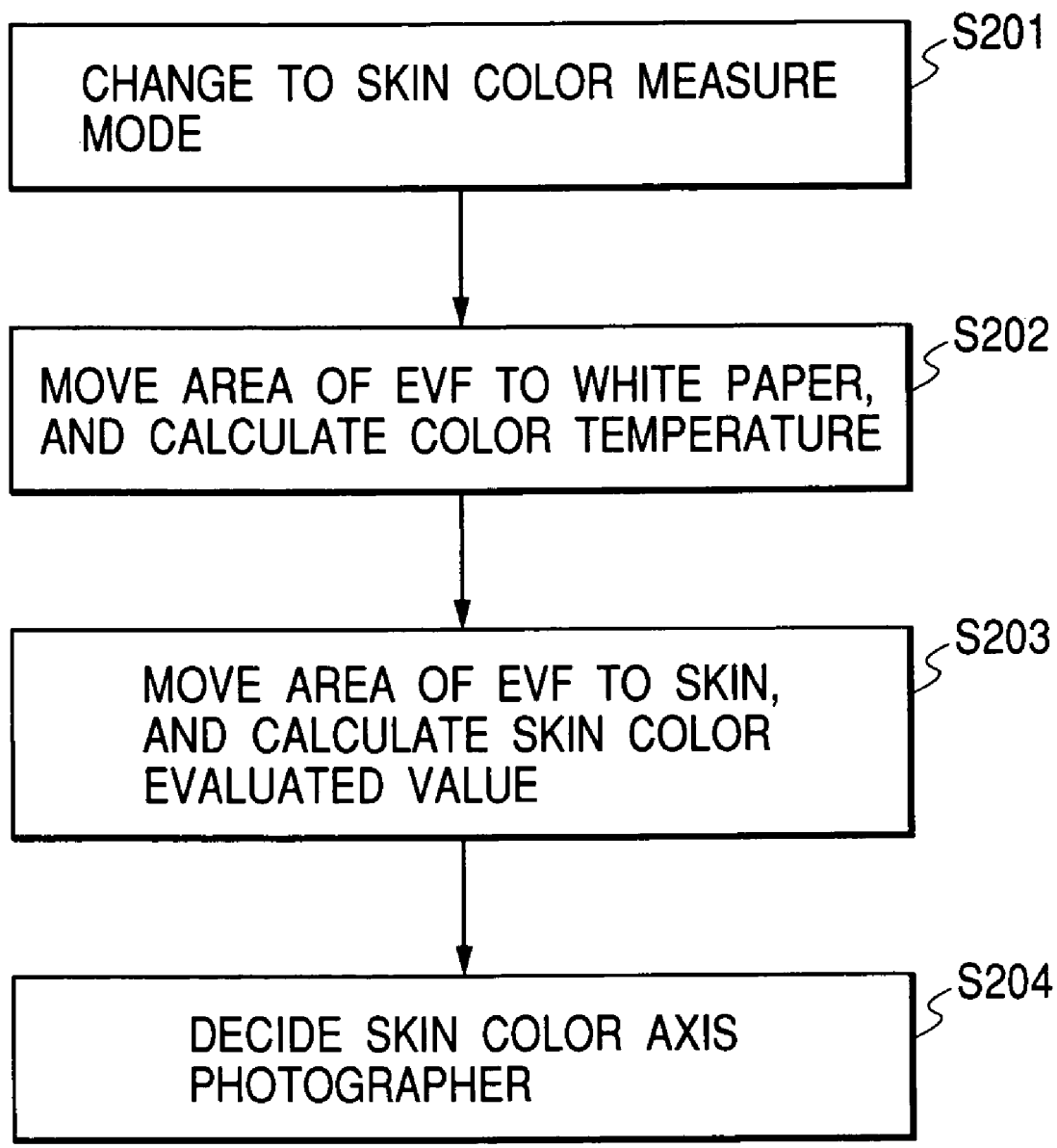
FIG. 12 is a flowchart showing the operation processing of an image pickup device in accordance with a second embodiment of the present invention.

In the first embodiment, the white balance processing is executed by using a predetermined skin color detection area. The second embodiment is different from the first embodiment in that, in Step S101, the setting of the skin color axis of the object to be photographed can be added to a camera by a photographer on the basis of the predetermined skin color detection area. A process for determining the skin color detection area (processing in Step S101 of FIG. 6) in the second embodiment is shown in a flowchart of FIG. 12, and will be described below.

Figure 13:
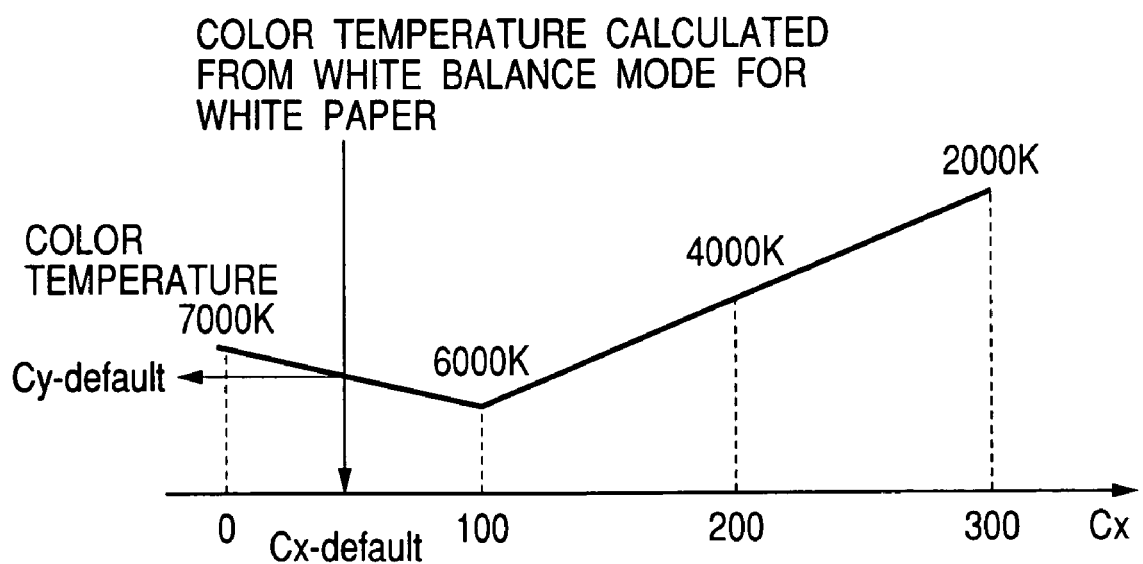
FIG. 13 is a diagram showing a correspondence between the color evaluated value and the color temperature.

First, in Step S201, a mode for adjusting the white balance is set to a skin color measure mode. Then, in Step S202, an object to be photographed of white color or gray such as white paper is photographed. Then, the color evaluated value of white color is obtained from the white detection area shown in FIG. 2, and the color temperature of the light source is specified. In this example, the present color temperature is measured by photographing the white paper. However, in the case where the color temperature is detected by an outer measure sensor, the detected temperature is used as the light source without calculating the color evaluated value on the white detection area which corresponds to the detected color temperature. Then, control advances to Step S203 in which the photographer (or person to be photographed) is photographed under the same light source as that in Step S202. Then, the skin color evaluated values Cx_skin, Cy_skin are obtained in accordance with the skin color detection area shown in FIG. 4. Those two values are called "adjusted values". In Step S204, the skin color axis of the photographer per se is prepared by using the adjusted values and the predetermined skin color axis. This method will be described. First, the Cx value Cx_default on the predetermined skin color axis and the Cy value Cy_default on the axis at the color temperature of the light source which is obtained from the white paper white balance mode are extracted from the skin color axis shown in FIG. 13 written in advance in a ROM not shown (in FIG. 13, the color evaluated values near the color temperature of the light source of 6,500 K are extracted). A difference between Cx_default and Cx_skin and a difference between Cy_default and Cy_skin, Cx_skin and Cy_skin being the skin colors of the photographer which are obtained from the skin color measure mode, are calculated as Cx and Cy, respectively. The skin color axis (skin color detection area) which is generated by the photographer can be registered in the ROM within the camera, and the selection of the skin color axis that has been registered at the time of photographing also enables application to another photography image.

$$\Delta Cx = Cx\_default - Cx\_skin$$

$$\Delta Cy = Cy\_default - Cy\_skin \qquad \text{Expression (5)}$$

Figure 14:
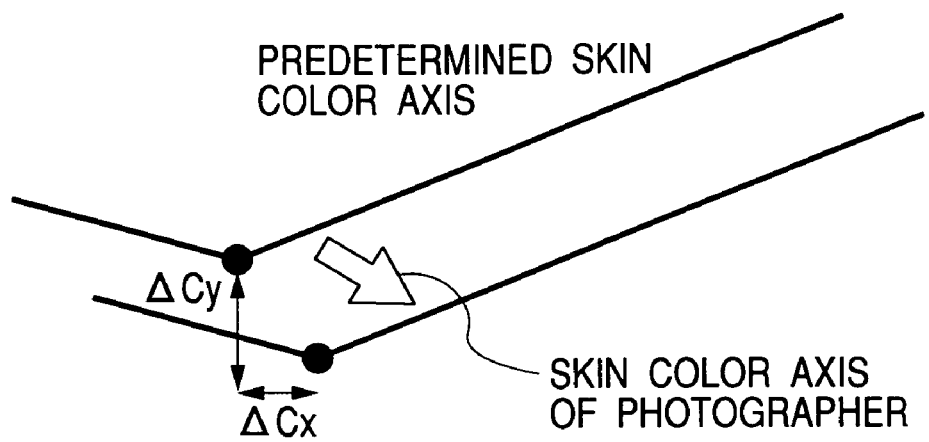
FIG. 14 is a diagram for explaining the operation processing of a white balance in accordance with the second embodiment of the present invention.

The skin color axis (skin color detection area) of the photographer per se (refer to FIG. 14) can be set by moving the axis in parallel to the predetermined skin color axis (skin color detection area) by a value obtained through the expression (5).

Figure 15:
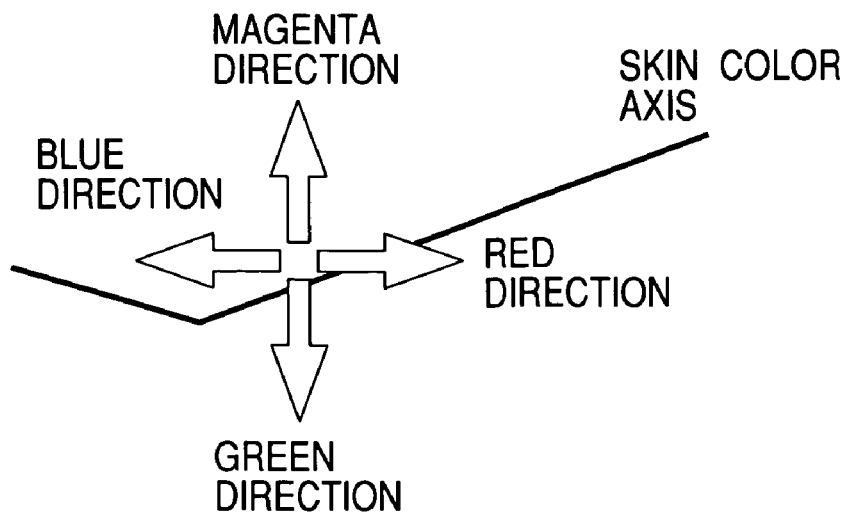
FIG. 15 is a diagram for explaining the operation processing of the white balance in accordance with the second embodiment of the present invention.

In addition, the calculated skin color axis is freely moved by the photographer, thereby making it possible to produce an image intended by the photographer. For example, if the complexion is intended to be better, it is sufficient to shift the calculated axis downward. As shown in FIG. 15, the upper side is magenta, the lower side is green, the left side is blue, and the right side is red with the skin color axis as a center. When the skin color axis is shifted downward, green is more corrected but magenta is not corrected with the result that the image is reddish. Also, if the complexion is intended to be more white, it is sufficient to shift the skin color axis rightward. With this operation, red is more corrected but blue is not corrected. On the UI, the degree to which the complexion is made alive and the degree to which the complexion is made white are variable by a knob, and the skin color axis is made to correspond to the amount of shift.

In this embodiment, the chromatic color is described as the skin color, but this embodiment can be also applied to an erroneous correction of the white balance with respect to another chromatic color. For example, in the case where light sky blue is judged as white so as to be white sky, the sky is specified in the same manner, and the judgement axis (area) which becomes white color is shifted leftward so that blue is not corrected.

Because the photographer can set the skin color detection area through the above-mentioned system, his or her complexion can be simply and freely changed to a preferred color. Also, because the skin color axis of the photographer (the object to be photographed) is obtained on the basis of the amount of shift between the color evaluated value on the predetermined skin color axis which corresponds to the present color temperature and the color evaluated value of the skin color of the photographer (the object to be photographed), it is possible to more accurately conduct the white balance processing suited for the photographer (the object to be photographed).

As described above, the color temperature of the light source is specified from the skin color of the person to be photographed instead of the white balance due to the color temperature measured by photographing the white paper, it is possible to conduct the white balance processing with high precision even in the case where no white exists within the screen. This system makes it possible to conduct the white balance processing that does not depend on the skin without erroneously recognizing the skin color of the high color temperature as the white color of the low color temperature as in the conventional art.

Another Embodiment

Subsequently, a third embodiment of the present invention will be described below.

Also, the present invention can be achieved by, for example, supplying a program code of software that realizes the function of the above-mentioned embodiment to an image pickup device through a network such as the Internet, and reading and executing the program code stored in a storage medium by a computer (or CPU, MPU) of the image pickup device.

In this case, the program code per se which is read from the storage medium realizes the function of the CPU 50 of the above-mentioned embodiment, and the storage medium in which the program code is stored structures the present invention.

An available storage medium for supplying the program code may be, for example, a floppy (registered trademark) disk, a hard disk, an optical disk, a magneto-optical disk, a CD-ROM, a CD-R, a magnetic tape, a nonvolatile memory card, a ROM, or the like.

Also, with the execution of the program code read by the computer, the functions of above-mentioned embodiments are realized. In addition, an operating system (OS) or the like that runs on the computer executes a part or all of the actual processing on the basis of the instructions of the program code to realize the functions of the above-mentioned embodiments through that processing.

In addition, after the program code read from the storage medium is written into a memory provided in a function enhancement board inserted into the computer or in a function enhancement unit which is connected to the computer, the CPU or the like provided in the function enhancement board or in the function enhancement unit conducts a part or all of the actual processing on the basis of the instructions of the program code, and the functions of the above-mentioned embodiments are realized by that processing.

In the case where the present invention is applied to the above storage medium, the program code that corresponds to the above-mentioned flowchart is stored in the storage medium, and briefly speaking, a module essential to the image pickup device according to the present invention is stored in the storage medium.

What is claimed is:

1. An image pickup device comprising:
    an imaging device;
    an instruction unit that instructs the selection of a given chromatic color area on a photography screen;
    a storage unit that stores a preset color detection range for a first person's skin color and an additional color detection range for a second person's skin color which is additionally set by a user's operation;
    a selection unit that selects one of the first and second persons' skin colors;
    a white balance processing unit that specifies a color detection range of a skin color on the basis of the selection result by said selection unit, and conducts white balance processing in accordance with a white balance coefficient that corresponds to a color temperature of a light source obtained on the basis of the specified color detection range and an output signal of the imaging device representing a parameter of the selected, given chromatic color area, and
    a user interface unit that allows a user to adjust the additional color detection range on a two dimensional color space that is represented by a red and a green direction.

2. An image pickup device according to claim 1, wherein the white balance processing unit calculates color evaluated values on the basis of the output signal of the imaging device, and specifies the color temperature of the light source on the basis of a color evaluated value that is determined to be included in the selected chromatic color area among the calculated color evaluated values.

3. An image pickup device according to claim 1, wherein the additional color detection range is set on the basis of the difference between a color evaluated value calculated using the preset color detection range and a color evaluated value of an actually photographed person's skin color.

4. An image pickup device according to claim 1, wherein the instruction unit comprises one of a touch panel and a visual line input.

5. An image pickup device according to claim 1, wherein the preset color detection range is a plurality of preset color detection ranges.

6. An image pickup device according to claim 5, wherein the preset color detection range is selected on the basis of an input language that is inputted to the image pickup device by a photographer.

7. A white balance processing method for an image pickup device, comprising:
    instructing a display device that displays an image to select a given chromatic color area of the image on the display device;
    storing a preset color detection range for a first person's skin color and an additional color detection range for a second person's skin color which is additionally set by a user's operation;
    selecting one of the first and second persons' skin colors;
    specifying a color detection range of skin color on the basis of the selection result in said selecting step;
    conducting white balance processing in accordance with a white balance coefficient that corresponds to a color temperature of a light source obtained on the basis of the specified color detection range and an output signal of an imaging device of the image pickup device representing a parameter of the selected, given chromatic color area; and
    providing a user interface unit to allow a user to adjust the additional color detection range on a two dimensional color space that is represented by a red and a green direction.

* * * * *